US012613085B2

(12) United States Patent
Nahum

(10) Patent No.: US 12,613,085 B2
(45) Date of Patent: Apr. 28, 2026

(54) MICROMETER HEAD DISPLACEMENT SYSTEM UTILIZING IMAGING

(71) Applicant: Mitutoyo Corporation, Kanagawa-ken (JP)

(72) Inventor: Michael Nahum, Seattle, WA (US)

(73) Assignee: Mitutoyo Corporation, Kanagawa-Ken (JP)

( * ) Notice: Subject to any disclaimer, the term of this patent is extended or adjusted under 35 U.S.C. 154(b) by 699 days.

(21) Appl. No.: 17/955,051

(22) Filed: Sep. 28, 2022

(65) Prior Publication Data

US 2024/0102784 A1    Mar. 28, 2024

(51) Int. Cl.
| *G01B 3/18* | (2006.01) |
| *G06T 7/13* | (2017.01) |
| *G06T 7/70* | (2017.01) |
| *H04N 23/63* | (2023.01) |

(52) U.S. Cl.
CPC .................. *G01B 3/18* (2013.01); *G06T 7/13* (2017.01); *G06T 7/70* (2017.01); *H04N 23/631* (2023.01); *G06T 2207/30204* (2013.01)

(58) Field of Classification Search
CPC .. G01B 3/18; G01B 3/00; G06T 2207/20016; G06T 2207/30164; G06T 2207/30204; G06T 7/13; G06T 7/70; G06T 7/73; G06T 7/00; G06T 2207/00; G06T 2207/20; H04N 23/631; H04N 23/63
USPC ......................................................... 33/701
See application file for complete search history.

(56) References Cited

U.S. PATENT DOCUMENTS

| 4,550,507 | A | 11/1985 | Nishikata | |
| 6,115,934 | A | 9/2000 | Sato et al. | |
| 6,490,541 | B1 * | 12/2002 | Ariga | ..................... B23Q 17/24 |
| | | | | 702/158 |
| 6,513,257 | B2 | 2/2003 | Nejad-Sattari | |
| 7,003,161 | B2 | 2/2006 | Tessadro | |
| 7,030,351 | B2 | 4/2006 | Wasserman et al. | |
| 7,101,461 | B2 * | 9/2006 | Allen | ..................... G01N 21/86 |
| | | | | 356/429 |

(Continued)

FOREIGN PATENT DOCUMENTS

| CN | 108801097 A | * | 11/2018 | ............... G01B 3/18 |
| CN | 109297379 A | * | 2/2019 | ............... G01B 3/18 |

(Continued)

*Primary Examiner* — John E Breene
*Assistant Examiner* — Daniel M Quinn
(74) *Attorney, Agent, or Firm* — Seed Intellectual Property Law Group LLP

(57) ABSTRACT

A micrometer head displacement system includes a micrometer head and an imaging portion. The micrometer head includes a coarse scale and a fine scale. The system is configured to: acquire at least one image of the micrometer head from the imaging portion; determine a coarse measurement based at least in part on the at least one image wherein the coarse measurement corresponds to a coarse relative position between the coarse scale and a coarse fiducial line; determine a fine measurement based at least in part on the at least one image and based on calculating an interpolated position of the a fiducial line wherein the fine measurement corresponds to a fine relative position between the fine scale and the fine fiducial line; and determine a micrometer head displacement based at least in part on summing the coarse measurement with the fine measurement.

19 Claims, 10 Drawing Sheets

(56)  References Cited

U.S. PATENT DOCUMENTS

| | | | | |
|---|---|---|---|---|
| 7,522,763 | B2 | 4/2009 | Tessadro | |
| 7,567,713 | B2 | 7/2009 | Ding | |
| 7,627,162 | B2 | 12/2009 | Blanford et al. | |
| 8,328,729 | B2 * | 12/2012 | Reynolds | A61B 5/411 |
| | | | | 600/538 |
| 9,304,089 | B2 | 4/2016 | Gladnick | |
| 9,689,652 | B2 * | 6/2017 | Jordil | G01B 21/047 |
| 10,825,216 | B2 | 11/2020 | Abe | |
| 2005/0259273 | A1 * | 11/2005 | Mian | B61K 9/08 |
| | | | | 356/601 |
| 2015/0096183 | A1 * | 4/2015 | Laflen | G01B 3/26 |
| | | | | 33/531 |
| 2015/0363936 | A1 * | 12/2015 | Hallett | G06F 3/0325 |
| | | | | 382/106 |
| 2018/0235119 | A1 * | 8/2018 | Hoshikawa | H05K 13/0417 |
| 2021/0372762 | A1 * | 12/2021 | Yamaji | G01B 5/02 |
| 2022/0230348 | A1 * | 7/2022 | Huber | G06T 7/74 |

FOREIGN PATENT DOCUMENTS

| | | | | |
|---|---|---|---|---|
| JP | 2017129531 | A | * | 7/2017 |
| JP | 6622475 | B2 | | 12/2019 |
| JP | 6804624 | B2 | | 12/2020 |

* cited by examiner

MICROMETER HEAD DISPLACEMENT SYSTEM UTILIZING IMAGING

BACKGROUND

Technical Field

This disclosure relates to metrology and, more particularly, to micrometer head displacement systems.

Description of the Related Art

A micrometer head is known which includes a main (coarse) scale and secondary (fine) scale. Such micrometer heads as included in micrometers are disclosed, for example, in U.S. Pat. Nos. 4,550,507 and 6,115,934, each of which is hereby incorporated herein by reference.

Depending on the positioning of a micrometer head, for example when the micrometer head is placed in a tight space such that its scales are not easily visible, reading the scales to determine a micrometer head displacement (i.e., a micrometer head measurement) may be difficult. In addition, it is sometimes difficult for novice users to accurately interpret the marks on the scales for determining a micrometer head displacement. The present disclosure is directed to providing a technical solution to accurately determine a micrometer head displacement.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

According to one aspect, a micrometer head displacement system is provided which includes a micrometer head, an imaging portion comprising at least one camera and configured to acquire images of the micrometer head, one or more processors, and a memory coupled to the one or more processors and storing program instructions.

The micrometer head comprises:

a coarse scale and a coarse fiducial line configured to move relative to one another for indicating a coarse scale measurement; and a fine scale and a fine fiducial line configured to move relative to one another for indicating a fine scale measurement.

The program instructions stored in the memory, when executed by the one or more processors, cause the one or more processors to at least:

acquire at least one image of the micrometer head from the imaging portion;

determine a coarse measurement based at least in part on the at least one image, wherein the coarse measurement corresponds to a coarse relative position between the coarse scale and the coarse fiducial line;

determine a fine measurement based at least in part on the at least one image and based on calculating an interpolated position of the fine fiducial line, wherein the fine measurement corresponds to a fine relative position between the fine scale and the fine fiducial line; and determine a micrometer head displacement based at least in part on summing the coarse measurement with the fine measurement.

According to another aspect, a method of operating a micrometer head displacement system is provided. The method comprises:

controlling an imaging portion of the micrometer head displacement system comprising at least one camera to acquire at least one image of a micrometer head, wherein the micrometer head includes a coarse scale and a coarse fiducial line configured to move relative to one another for indicating a coarse scale measurement, and a fine scale and a fine fiducial line configured to move relative to one another for indicating a fine scale measurement;

determining a coarse measurement based at least in part on the at least one image, wherein the coarse measurement corresponds to a coarse relative position between the coarse scale and the coarse fiducial line;

determining a fine measurement based at least in part on the at least one image and based on calculating an interpolated position of the fine fiducial line, wherein the fine measurement corresponds to a fine relative position between the fine scale and the fine fiducial line; and determining a micrometer head displacement based at least in part on summing the coarse measurement with the fine measurement.

DETAILED DESCRIPTION

Figure 1:
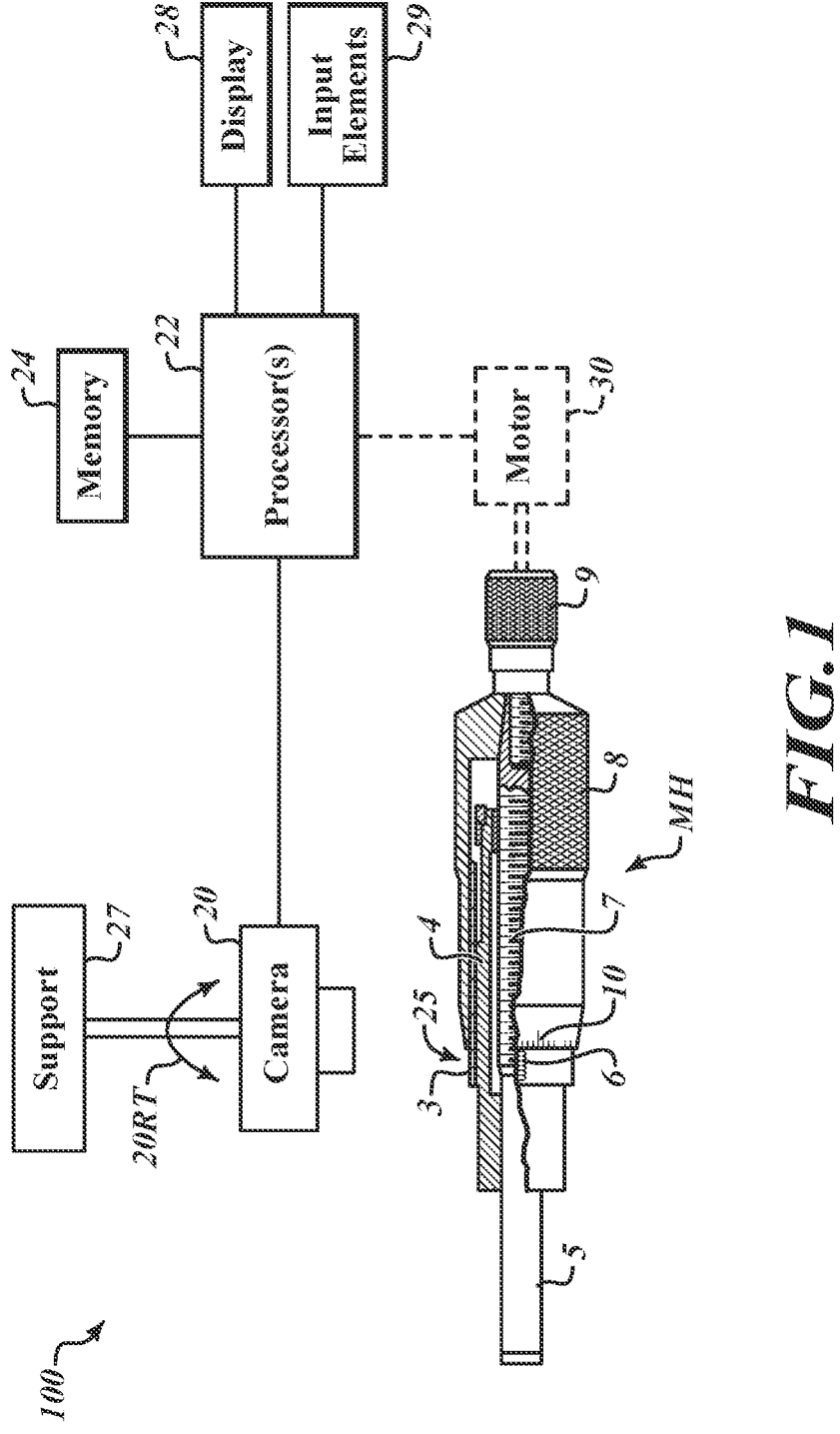
FIG. 1 is a diagram of a micrometer head displacement system including a micrometer head shown in a front, partially cut away view, an imaging portion, and processor (s)

FIG. 1 illustrates an overall configuration of a micrometer head displacement system 100 including a micrometer head MH, an imaging portion 20 comprising at least one camera, one or more processor(s) 22, and a memory 24 coupled to the one or more processors 22 and storing program instructions. The program instructions, when executed by the one or more processors 22, cause the one or more processors 22 to perform defined micrometer head displacement determination operations based on images obtained by the imaging portion 20, as will be more fully described below.

As shown in FIG. 1, the micrometer head MH according to an exemplary embodiment includes a spindle 5 supported through an inner sleeve 4 so as to be linearly movable along an axis of the spindle. The micrometer head MH includes an outer sleeve 3 placed and fixed onto the outside of the inner sleeve 4. A main (coarse) scale 6 having, for example, a pitch of 0.5 mm in the illustrated embodiment is formed on the outer peripheral surface of the outer sleeve 3 along the axial direction thereof.

An externally threaded portion 7 having a pitch of 0.5 mm is formed on the spindle 5 over a range from the substantially central portion to a position close to the outer end of the spindle 5. A thimble 8 is rotatably coupled to the outer peripheral surface of the outer sleeve 3 and integrally connected with the spindle 5, and a control knob 9 is secured to the outer end of the spindle 5. Formed on the outer peripheral surface of the inner end of the thimble 8 is a secondary (fine) scale 10 having a pitch obtained by dividing the outer periphery (circumference) of the inner end of the thimble 8 into 50 equal sections in the illustrated embodiment so that a full rotation of the thimble 8 covers a distance of 0.01 mm (per fine marking)×50 fine markings=0.5 mm, which corresponds to the pitch of the coarse scale 6. In exemplary embodiments, the control knob 9 is provided with a ratchet mechanism so as to deliver a constant measuring force on the spindle 5 to ensure accurate, repeatable measurements. In operation, rotation of the thimble 8 causes the spindle 5 to linearly move along the axis of the micrometer head MH in accordance with the pitch of the externally threaded portion 7. The coarse scale 6 and the fine scale 10 can be read to determine a micrometer head (position) displacement, or a micrometer head measurement.

The imaging portion 20 comprises any suitable imaging element such as at least one camera (e.g., a USB camera, a smartphone camera, etc.). The imaging portion 20 is configured to acquire images of the micrometer head MH or, more specifically, a scale portion 25 of the micrometer head MH including the coarse scale 6 and the fine scale 10. The imaging portion 20 may be held relative to the scale portion 25 either manually, or mechanically or electro-mechanically using a suitable support 27. In some embodiments, the support 27 may be provided in the form of a clamp, clip, or adhesive (e.g., adhesive tape). In various embodiments, the support 27 may be a manually, mechanically or electro-mechanically adjustable so as to change the position and/or orientation of the imaging portion 20 relative to the scale portion 25. For example, the imaging portion 20 can be rotated about the spindle 5 of the micrometer head MH as indicated by a rotation-direction arrow 20RT. Such rotation may be helpful for the imaging portion 20 to be optimally oriented (e.g., forward facing) relative to the micrometer head MH to acquire an image that can be readily processed to accurately determine a micrometer head displacement, as will be described later. Various means for realizing such support 27 are apparent to those skilled in the art. In various embodiments, the micrometer head MH may include a motor system 30 configured to turn the knob 9 under the control of the one or more processors 22 to free the user from manually operating the micrometer head MH or to speed up the operation of the micrometer head MH.

The one or more processors 22 in various embodiments may be embodied as a signal processing electronic circuit in integrated circuit (IC) chip(s). The one or more processors 22 receive image signals from the imaging portion 20 and process the image signals to determine a micrometer head displacement (or a micrometer head position). In exemplary embodiments, the one or more processors 22 acquire at least one image of the micrometer head MH from the imaging portion 20, determine a coarse measurement based at least in part on the at least one image, determine a fine measurement based at least in part on the at least one image and based on determining an interpolated fine measurement, and determine a micrometer head displacement based at least in part on summing the coarse measurement with the fine measurement. It will be appreciated that the one or more processors 22 may comprise any combination of signal processing and physical circuitry. The one or more processors 22 may be coupled to a display 28 and input element(s) 29 such as a touch screen, a key board, etc. In some embodiments, the one or more processors 22, display 28, and input elements 29 may be embodied in a portable computer device such as a personal computer, a tablet device, a smartphone, etc. In other embodiments, the one or more processors 22, display 28, and/or input elements 29 may be integrally formed with the micrometer head MH.

Figure 2:
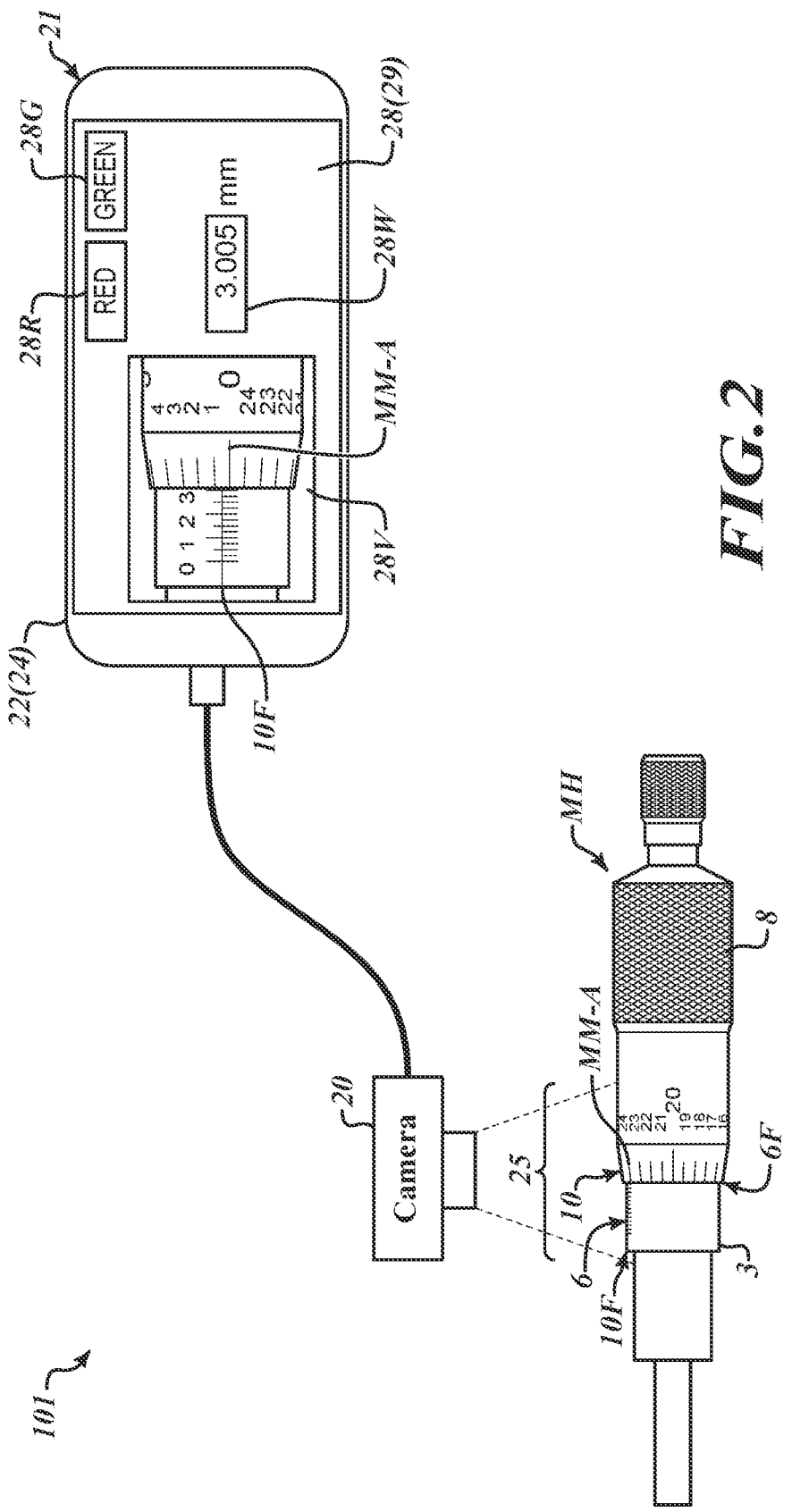
FIG. 2 is a schematic illustration of a micrometer head displacement system including a micrometer head, an imaging portion, and a display.

FIG. 2 is a schematic Illustration of a micrometer head displacement system 101 including a micrometer head MH, an imaging portion 20 (e.g., a USB camera), and a smartphone 21 which contains the one or more processors 22, memory 24, display 28 and input elements (e.g., touch screen) 29. The imaging portion 20 is arranged and configured to acquire at least one image of the scale portion 25 of the micrometer head MH including the coarse scale 6 and the fine scale 10.

The inner end (edge) of the thimble 8 serves as a coarse fiducial line 6F configured to move relative to the coarse scale 6 for indicating a coarse scale measurement. Specifically, of the coarse scale 6, a fully visible marking (graduation) that is closest to the coarse fiducial line 6F indicates a coarse sale measurement, which is 3.00 mm in the illustrated example. A fine fiducial line 10F is provided by a horizontal line extending perpendicularly to the markings of the coarse scale 6 on the outer peripheral surface of the outer sleeve 3. The fine scale 10 is configured to move relative to the fine fiducial line 10F for indicating a fine scale measurement. Specifically, on the fine scale 10, a full marking (graduation) that is closest to and does not exceed "above" the fine fiducial line 10F as illustrated indicates a fine scale measurement, which is "0" in the illustrated example.

In operation, the imaging portion 20 acquires images of the micrometer head MH or, more specifically, of the scale portion 25 of the micrometer head MH, and the one or more processors 22 acquire at least one image of the micrometer head MH from the imaging portion 20. The one or more processors 22 process the at least one image to determine a coarse measurement based at least in part on the at least one image, determine a fine measurement based at least in part on the at least one image and based on determining an interpolated fine measurement (e.g., 0.005 mm, which corresponds to a middle position between fine scale marking 0 (0 mm) and fine scale marking 1 (0.01 mm)), and determine a micrometer head displacement based at least in part on summing the coarse measurement (e.g., 3.00 mm) with the fine measurement (e.g., 0.005 mm). In the illustrated example, the micrometer head displacement is calculated to be 3.005 mm and displayed in a measurement window 28W on the display 28. In various embodiments, the calculated micrometer head displacement may be stored in the memory 24 for subsequent processing. In various embodiments, the micrometer head displacement system 100 may include the motor system 30 configured to turn the control knob 9 of the micrometer head MH, and the one or more processors 22 may use the calculated micrometer head displacement and/or other factors/inputs to control the motor system 30 to automatically operate, or adjust operation of, the micrometer head MH.

In some implementations, a user may be allowed to enter the type of micrometer head MH, or the total number of markings on the fine scale 10 of the micrometer head MH, or other factors or characteristics, so as to calibrate the image recognition determination of a micrometer head displacement. For example, a user may manually enter, via the input elements 29, the total number of markings on the fine scale 10. As another example, a menu of different types of micrometer heads MHs may be presented on the display 28, from which a user may select a type corresponding to the micrometer head MH in use. Some different types of micrometer heads MHs may include:

Type 100, wherein the fine scale numbers go from 0-99 (total 100), with graduation of 0.01 mm; thus increments on the coarse scale are 1 mm increments (=100× 0.01 mm);

Type 50, wherein the fine scale numbers go from 0-49 (total 50), with graduation of 0.01 mm; thus increments on the coarse scale are 0.5 mm increments (=50×0.01 mm); and Type 25, wherein the fine scale numbers go from 0-24 (total 25), with graduation of 0.01 mm; thus increments on the coarse scale are 0.25 mm increments (=25×0.01 mm).

With any of the micrometer head types above, each time the thimble 8 makes a full 360 degree rotation, the thimble 8 is moved across the coarse scale 6 along the axial direction thereof from one coarse measurement marking to the next.

Next, the image recognition processing to determine a coarse measurement, a fine measurement, and a micrometer head displacement will be described. The type of the micrometer head MH, if entered or selected by a user as described above, is used to calibrate the image recognition processing accordingly, as will be apparent to those skilled in the art.

In the example of FIG. 2, the coarse scale 6 is in 0.25 mm increments and, accordingly, the fine scale 10 ranges from 0 to 0.25 mm in 0.01 mm increments as indicated by markings 0 to 24.

In various embodiments, the imaging portion 20 is oriented relative to the micrometer head MH such that the scale portion 25, which is typically on a curved surface of the outer sleeve 3 and the thimble 8, faces forward to the imaging portion 20. This facilitates easier determination of accurate measurements based on image recognition of the scale portion 25. Various image analysis techniques are available to check and ensure proper orientation of the imaging portion 20 relative to the micrometer head MH.

One exemplary technique involves rotating the imaging portion (camera) 20 about the micrometer head MH as indicated by the rotation-direction arrow 20RT (see FIG. 1) while keeping the fine fiducial line 10F centered in the camera field of view, as shown in a view window 28V on the display 28 in FIG. 2, until an equal number of fine measurement markings MM-A are visible above and below the fine fiducial line 10F. In the illustrated example, five fine measurement markings MM-A are visible above the fiducial line 10F (numbered 1, 2, 3, 4, 5) and below the fiducial line 10F (numbered 0, 24, 23, 22, 21) to indicate that the scale portion 25 in the field of view of the imaging portion 20 is generally forward facing and not skewed relative to the imaging portion 20. In the illustrated example where the fine fiducial line 10F is a horizontal line, the fine fiducial line 10F is positioned to intersect middle (half-way) points of the vertical edges of the field of view to be centered in the field of view.

In some embodiments, if the numbers of fine measurement markings visible above the fine fiducial line 10F and the number of fine measurement markings visible below the fine fiducial line 10F do not match, a red light 28R may be lit on the display 28, or any other suitable alert indication may be provided, to prompt adjustment of the position/orientation of the imaging portion 20 and/or the micrometer head MH, either manually or automatically. Once the numbers of fine measurement markings on both sides of the fine fiducial line 10F match, indicating that the imaging portion 20 is properly positioned/oriented relative to the micrometer head MH, then a green light 28G may be lit on the display 28, or any other suitable confirmation indication may be provided, to "green-light" a measurement operation using the micrometer head displacement system 100/101. In some embodiments, the one or more processors 22 may be configured to start micrometer head displacement imaging operations only after (e.g., in response to) the green-light or other suitable confirmation indication. For example, in response to the green light 28G or other suitable confirmation indication, an "OK" button (not shown) may appear on the display 28, which the user may select to start micrometer head displacement imaging operations. Thereafter, the display 28 may show a digital value corresponding to the current measurement in the measurement window 28W, and may additionally show the image of the scale portion 25 which is subjected to image recognition processing in the view window 28V.

The micrometer head displacement system 101 of FIG. 2 may include the imaging portion 20 comprising a USB camera, which can be independently placed/fixed near the micrometer head MH, using suitable fixing means such as a clamp, clip, adhesive, etc. (see support 27 in FIG. 1). In operation, the display 28 of the smartphone 21 (or any suitable computer) may be placed in a location which is easy/convenient for a user to view both while positioning the USB camera (e.g., in the view window 28V) and for viewing measurement values (in the measurement window 28W) which are output based on the analysis of the image(s) captured by the USB camera.

The one or more processors 22 execute image recognition software to determine a coarse measurement and a fine measurement based at least in part on at least one image acquired by the imaging portion 20, and to determine a micrometer head displacement based at least in part on summing the coarse measurement with the fine measurement. Various machine vision metrology applications known in the art, such as machine vision metrology software tools configured to determine precise edge locations of a workpiece and/or distances between the edge locations (commonly referred to as "edge tools"), may be used to identify the edge locations of the coarse and fine measurement markings and the fine fiducial line 10F according to various embodiments of the present disclosure. For example, point, line or box tools, well known in the machine vision metrology field, may be used to analyze an image acquired by the imaging portion 20 with scanning lines to produce contrast curves based on pixel intensity (gray) values. Edge locations of the measurement markings (scale markings) and the fine fiducial line 10F may be determined as corresponding to peaks of the contrast curves where the largest contrast is observed in the image.

FIGS. 3-9 below will be described in terms of example operations of edge tools (e.g., point and box edge tools), which in certain embodiments may be, or may be analogous to, "video tools" which may utilize scan lines to determine edge locations. It will be appreciated that in various implementations, similar operations (e.g., including utilization of scan lines or similar techniques) may be performed to determine edge locations, which may be performed automatically, in some cases without otherwise displaying and/or utilizing other features of the "video tool" or other tool type features illustrated and described below with respect to the simplified examples of FIGS. 3-9. Various analogous video tools are described in U.S. Pat. Nos. 7,003,161; 7,030,351; 7,522,763; and 7,567,713; and 7,627,162, each of which is hereby incorporated herein by reference.

Figure 3:
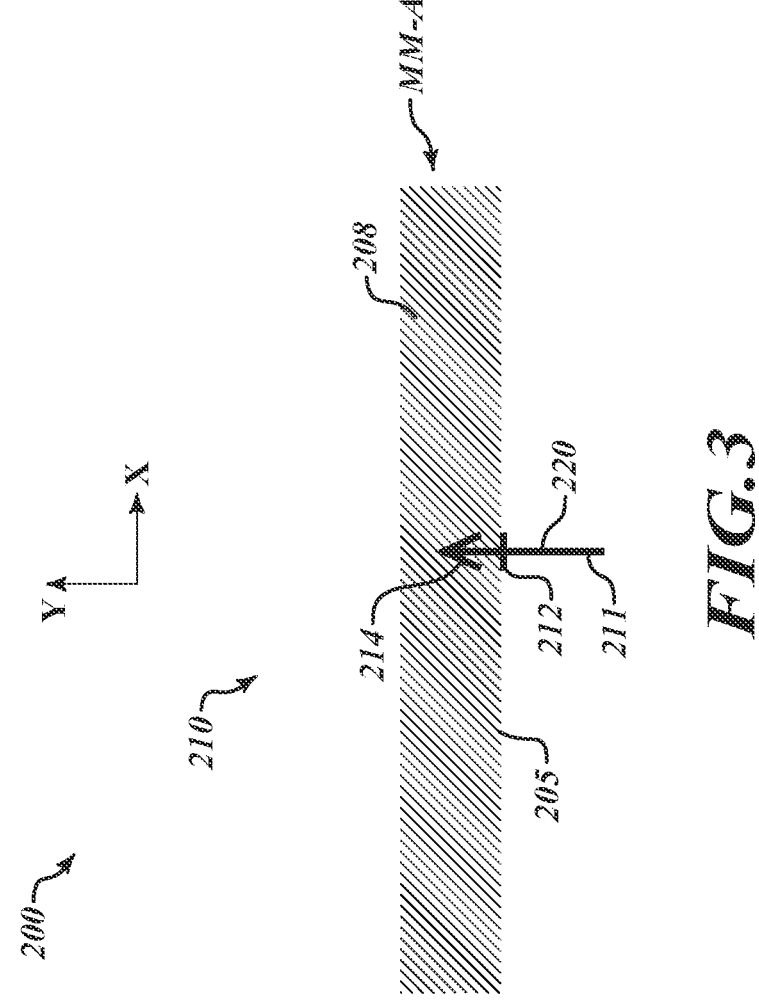
FIG. 3 is a diagram of an exemplary point tool overlaying a first (bottom) edge of a measurement marking (e.g., a fine scale marking) in an image.

FIG. 3 is a diagram of an exemplary point tool 210 overlaying a first edge 205 of a measurement marking (MM-A) (e.g., a fine measurement marking of the fine scale 10, see FIG. 2) at the boundary of a darker or shaded area 208 in an image 200 acquired by the imaging portion 20 (e.g. on an image display device). In FIG. 3, as well as figures described below, shaded areas such as the shaded area 208 are shown for purposes of illustration, to indicate pixels with relatively higher "gray values" in an image which are assumed in these examples to correspond to the areas of the measurement markings. In various implementations, higher gray values may correspond to relatively lower intensity pixels, or relatively higher intensity pixels, depending on the configuration.

As will be described in more detail below, the point tool 210 may be configured for determining the location of an edge point on an edge in the image, and similar operations may underlie the operation of another type of tool (e.g. a box-type edge tool) that locates multiple edge points on an edge, as will be described in more detail below in reference to FIG. 4. In certain implementations, the point tool 210 may include a body 211, an edge selector 212, and a polarity indicator arrowhead 214. The arrowhead 214 may generally point from light-to-dark, or dark-to-light, across an edge to enhance edge-finding reliability in certain situations, as explained in the incorporated references. In the illustration of FIG. 3, the body 211 obscures a nominal scan line 220 defined by, and nominally coinciding with, the body 211. Scan lines (220 and 320) will also be illustrated and described in more detail below with reference to FIG. 4.

In various implementations, certain of the operations described below (e.g., utilizing the scan lines for determining an edge location) may be performed automatically by the micrometer head displacement system 100/101 (e.g., without displaying the corresponding video tool features on a display).

In operation, the micrometer head displacement system 100/101 may be configured to automatically select and utilize a point tool and/or corresponding operations (e.g., utilizing scan line(s)) or a user may select the point tool 210 or corresponding operations. The system or user may identify an edge feature to be detected by placing the body 211 over the edge feature and placing the edge selector 212 as close as possible to the edge, at a desired location along the edge. The point tool body 211 may be oriented to define and indicate a desired scan line orientation across the edge (e.g., which for simplicity in the illustrated example is parallel to the y-axis of the illustrated x-y coordinate system but may alternatively be at an angle relative to the x and y axes within the x-y coordinate system in certain implementations). In FIG. 3, and other figures herein, image pixels are arranged in rows along the x-coordinate direction and columns along the y-coordinate direction. The arrow 214 points along a reference direction or polarity to be associated with the edge detection. In operation, once the point tool 210 is configured (and/or once corresponding operations are automatically determined and/or performed), the instructions of an underlying edge point locating routine may be executed to perform operations that analyze intensity profile data points (e.g., pixel intensity data) associated with a scan line that nominally coincides with the body 211 of the point tool 210, and perform various operations to detect the edge location of the underlying feature. As will be described in more detail below with respect to FIG. 5, in various exemplary embodiments, the edge point locating routine of the point tool 210 may determine an edge location based on the magnitude of the gradient along an intensity profile associated with the scan line.

Figure 4:
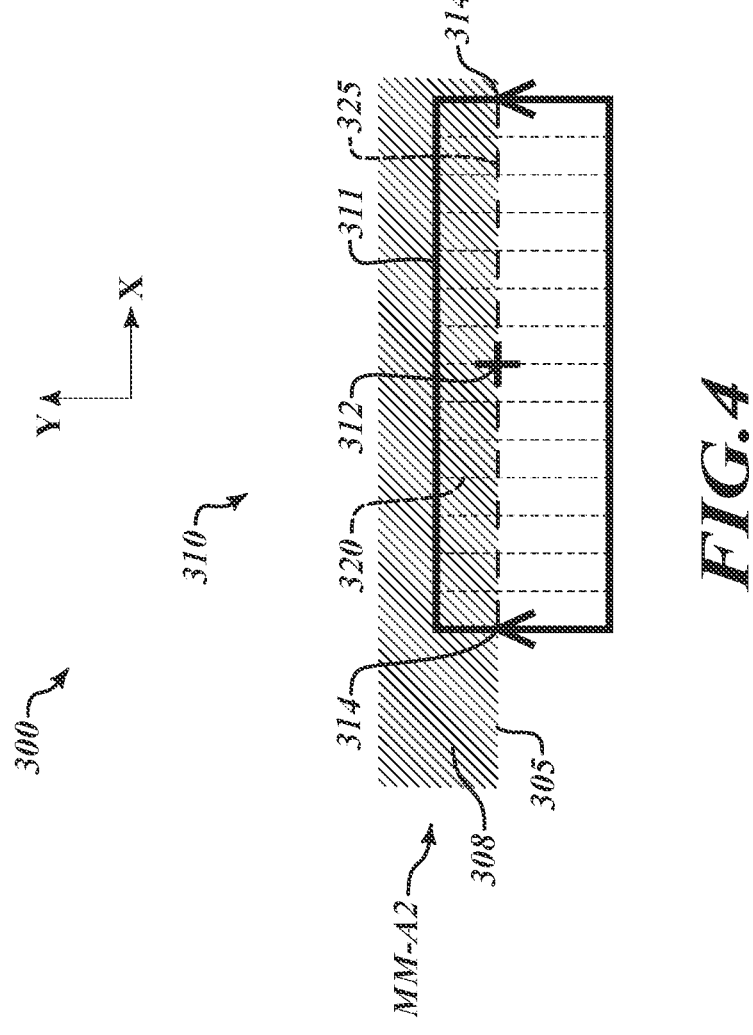
FIG. 4 is a diagram of an exemplary box tool overlaying a first (bottom) edge of a measurement marking (e.g., a fine scale marking) in an image.

FIG. 4 is a diagram of an exemplary box tool 310 overlaying a first edge 305 of a measurement marking MM-A2 at the boundary of a shaded area 308 (corresponding to the measurement marking) in an image 300 (e.g., on an image display device). In various implementations, the box tool 310 may include a region of interest (ROI) indicator 311, polarity indicator arrows 314 along the side, and an edge selector 312 that is positioned on the desired edge to be detected. Within the box tool 310, nominal scan lines 320 may be indicated, which the box tool 310 generates and uses for determining edge points. Along each of the nominal scan lines 320, the box tool operates to determine an edge point of the underlying feature, as previously described for the scan line 220 of the point tool 210 of FIG. 3. As shown in FIG. 4, and as will be described in more detail below, a line 325 may be fit to the set of determined edge points, to determine the location and orientation of the edge 305.

In operation, the box tool 310 is selected and/or otherwise configured to identify an edge feature to be detected. The ROI indicator 311 may be positioned, sized and rotated (e.g., automatically or by an operator), such that the ROI includes the portion of the edge feature to be detected, and the edge selector 312 may be positioned to more precisely identify the edge to be detected at a desired location along the edge. The ROI indicator 311 may be oriented to define and indicate a desired scan line orientation across the edge. More generally, the orientation of the overall ROI indicator 311, the portions of the ROI indictor that include the arrows 314, or the orientations of the nominal scan lines 320 and/or corresponding operations may each be used to define and/or indicate the scan line orientation. The arrows 314 define the polarity to be associated with the edge detection. Once the box tool 310 is configured, the instructions of an underlying edge point locating routine may be executed to perform operations that analyze intensity profile data to detect edge points along each of the scan lines and fit a line to the detected edge points, as described in greater detail below.

To summarize, in general, edge points may be determined by various tools and/or corresponding operations, which in various implementations may fit geometric forms to the edge points in order to determine locations of corresponding underlying image features (e.g., as part of a process for determining the precise locations of measurement markings, etc.). In one conventional method of operating a tool, depending on the type of tool (e.g. point tool and box tool), one or more nominal scan lines are defined or generated (e.g., within a ROI or otherwise, such as according to defined tool parameters). For each nominal scan line, a set of intensity profile data point locations are determined that approximate the nominal scan line. Intensity values associated with the data point locations are determined, to define the intensity profile associated with the nominal scan line. Then, in one embodiment, an edge detection algorithm analyzes gradients along the intensity profile to find the location along the intensity profile that corresponds to the maximum gradient magnitude, as described in more detail below with reference to FIG. 5. The maximum gradient location along the intensity profile is used to determine the edge point location in the image that is associated with the nominal scan line.

Figure 5:
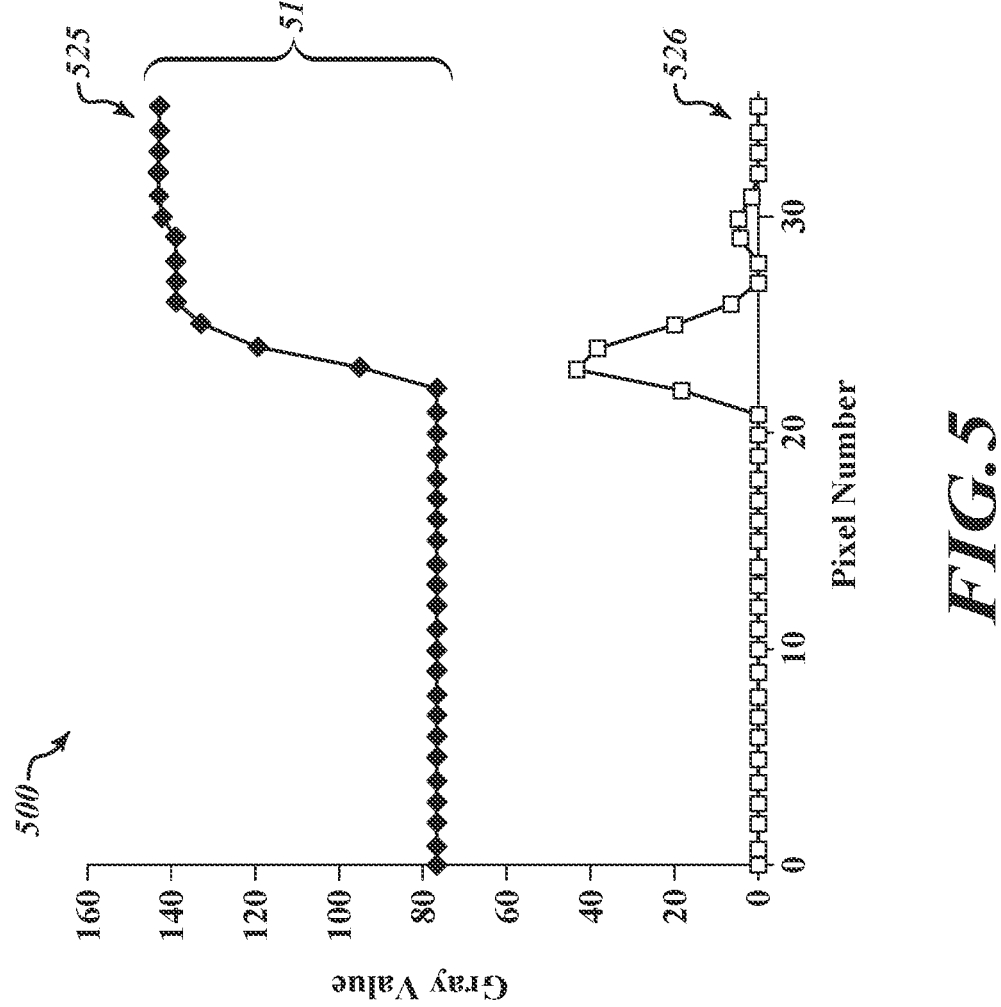
FIG. 5 is a diagram illustrating one exemplary method of determining a first edge location based on a set of pixel gray values.

FIG. 5 is a diagram of a graph 500 illustrating one exemplary method of determining an edge location based on an intensity profile 510. The intensity profile 510 comprises a set of image pixel intensity (gray) values 525 corresponding to positions of a scan line (e.g. such as one of the scan lines 220 or 320 shown in FIG. 3 or 4, respectively). The data points or positions representing the scan line are labeled as "Pixel Numbers" from 0-35 along the horizontal axis. Beginning from data point 0, the pixel intensity values initially indicate a relatively lighter region up to approximately data point 23, which is then followed by a relatively darker region up to data point 35.

It will be appreciated that the values and illustrations in FIGS. 3, 4 and 5 have been simplified in various respects with regard to the current examples. For example, in FIGS. 3 and 4 the determined edge location is illustrated as being between a relatively lighter region (e.g., near white) and a darker region, while in certain actual embodiments the "lighter region" may have a higher gray value (e.g., the surfaces of the micrometer head between the measurement markings may be medium gray), while the measurement markings may be relatively darker (e.g., as illustrated by the example "gray values" of FIG. 5). In addition, while the edges in FIGS. 3 and 4 are shown as being relatively "sharp" (i.e., with a relatively rapid transition between the lighter and darker regions), in certain actual embodiments the transition for the edges may occur over a number of pixels (e.g., as illustrated by the transition for the example gray values from the pixel 23 to the pixel 27 of FIG. 5).

Gradient magnitude values 526 are derived from the pixel intensity values 525 and are also shown in FIG. 5. Various conventional algorithms may be used to find the location along the horizontal axis that corresponds to a peak of the gradient magnitude (deemed to indicate the peak "contrast" between the pixel intensity values), and identify that location as an edge location. If there are multiple gradient magnitude peaks, then the video tool edge selector and/or orientation indicator (e.g. edge selector 212 and/or polarity indicator 214 of the point tool 210) may be used to assist the algorithm to identify the desired peak. In FIG. 5, the maximum gradient criterion (i.e., the gradient peak) indicates that the edge is located approximately at data point 23. By using methods that may include curve fitting, centroid determination, or the like, a gradient magnitude peak may be located relatively precisely between the intensity profile data points, which generally supports sub-pixel measurement resolution and repeatability when determining the location of the corresponding edge in the image. For example, while the gradient peak in the example of FIG. 5 is shown to be approximately at data point 23 (e.g., corresponding to pixel 23 in this example), it can be seen that another "near peak" occurs at data point 24 (pixel 24). This may indicate that a more precise determination of the edge location may correspond to a position between data points 23 and 24 (pixels 23 and 24), which may be determined by a process such as curve fitting, centroid determination, or the like. As a simplified concept, in an example where the data points 23 and 24 have a same gradient magnitude, such may correspond to an edge location exactly ½ way between the two (e.g., with an edge location corresponding to a data point/ pixel location of 23.5).

It should be noted that each measurement marking actually has two edges (e.g., a top edge and a bottom edge for each horizontal measurement marking), for which the "location" of the measurement marking for measurement purposes may be determined according to the middle as corresponding to an average between the two edges. Alternatively, if each measurement marking is only a few pixels wide or less, then the image pixel intensity (gray) values 525 graph of FIG. 5 may include a peak corresponding to the location of the narrow (e.g., few-pixels wide) measurement marking.

FIGS. 6-9 describe example operations of the image recognition processing to determine the location of a measurement marking by determining the locations of two edges (e.g., top and bottom edges) of a measurement marking MM-A.

Figure 6:
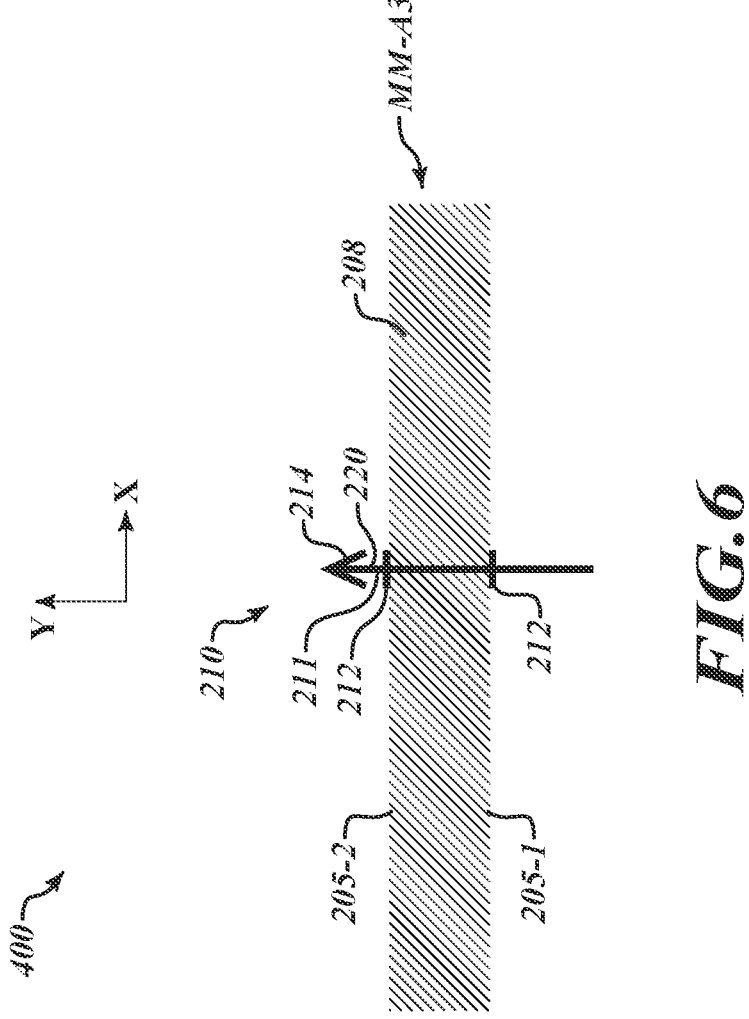
FIG. 6 is a diagram of an exemplary point tool overlaying first (bottom) and second (top) edges of a measurement marking (e.g., a fine scale marking) in an image.

FIG. 6 illustrates operation of an exemplary point tool 210 similar to the point tool 210 described in FIG. 3 above, except that the point tool 210 of FIG. 6 additionally includes a second edge selector 212. Specifically, in FIG. 6, the exemplary point tool 210 is illustrated to overlay a first edge 205-1 and a second edge 205-2 of a shaded area 208 corresponding to a measurement marking MM-A3 in an image 400. The point tool 210 may include a body 211, a polarity indicator arrowhead 214, and first and second edge selectors 212 that are programmed to be automatically placed (or manually placed by a user) as close as possible to the first and second edges 205-1 and 205-2, respectively. The body 211 obscures a nominal scan line 220 used to generate contrast curves, as shown in FIG. 7.

Figure 7:
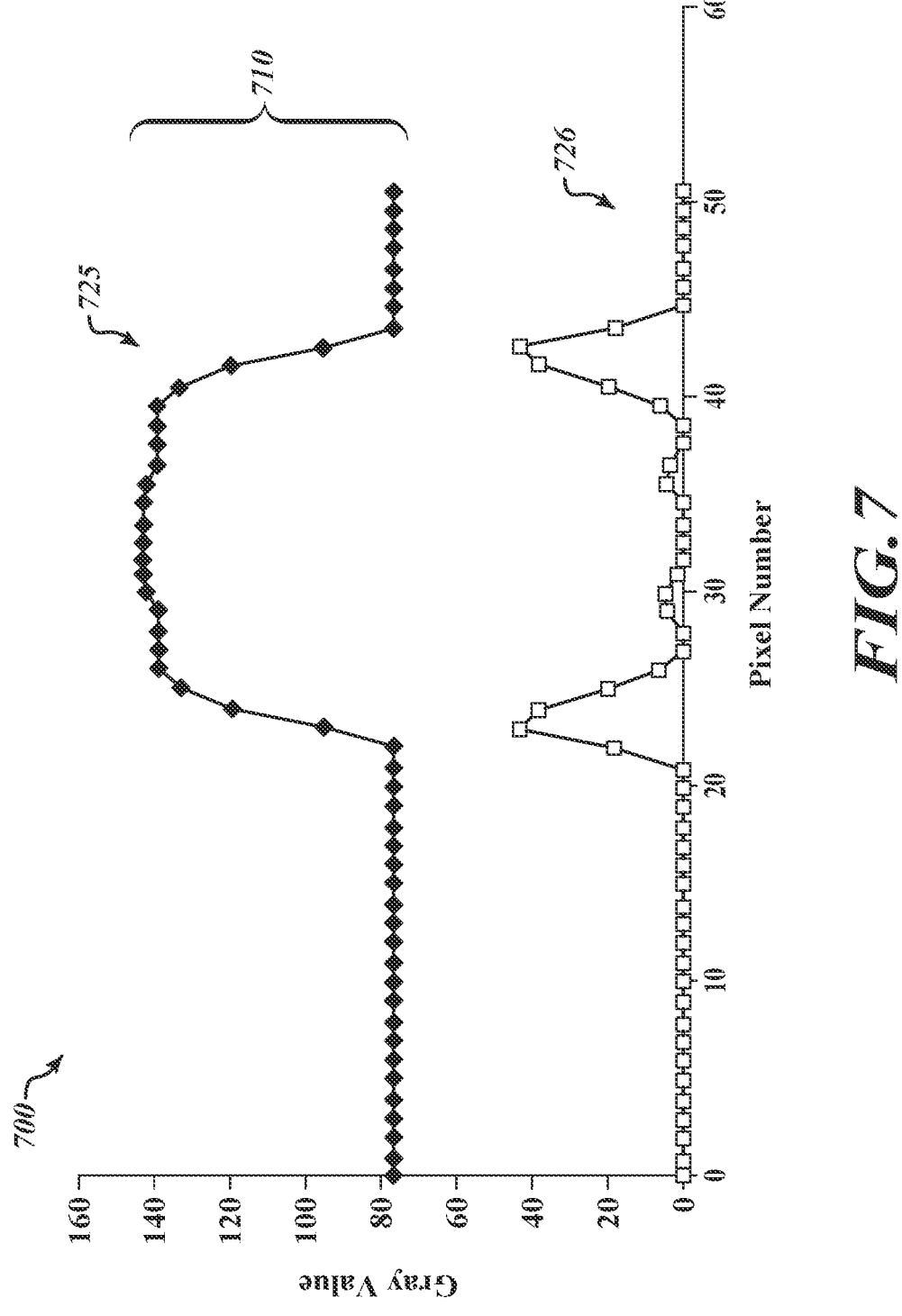
FIG. 7 is a diagram illustrating one exemplary method of determining first (bottom) and second (top) edge locations based on a set of pixel gray values.

FIG. 7 is a diagram of a graph 700 illustrating one exemplary method of determining the locations of the first and second edges 205-1 and 205-2 based on an intensity profile 710 produced based on the scan lines 220. The intensity profile 710 comprises a set of image pixel intensity (gray) values 725 corresponding to positions of a scan line, such as the scan line 220 shown in FIG. 6. The data points or positions representing the scan line are labeled as "Pixel Numbers" from 0 to 50 along the horizontal axis. Beginning from data point 0, the pixel intensity values initially indicate a relatively lighter region up to approximately data point 23, which is then followed by a relatively darker region up to data point 43, which is then followed by another relatively lighter region up to data point 50. Thus, the width of the measurement marking (corresponding to the shaded area 208 in FIG. 6) may correspond to approximately 20 pixels (=43 pixels–23 pixels).

Gradient magnitude values 726 are derived from the pixel intensity values 725 and are also shown in FIG. 7. Various conventional algorithms may be used to find the locations along the horizontal axis that correspond to two peaks of the gradient magnitude (each indicating the peak "contrast" between the pixel intensity values), and identify those two locations as two edge locations of the measurement marking MM-A3. The location of the measurement marking MM-A3 may be determined based on the two edge locations, for example, by taking an average of the two edge locations to identify a middle position of a distance between the two edge locations, as will be more fully explained below in reference to FIG. 8.

Figure 8:
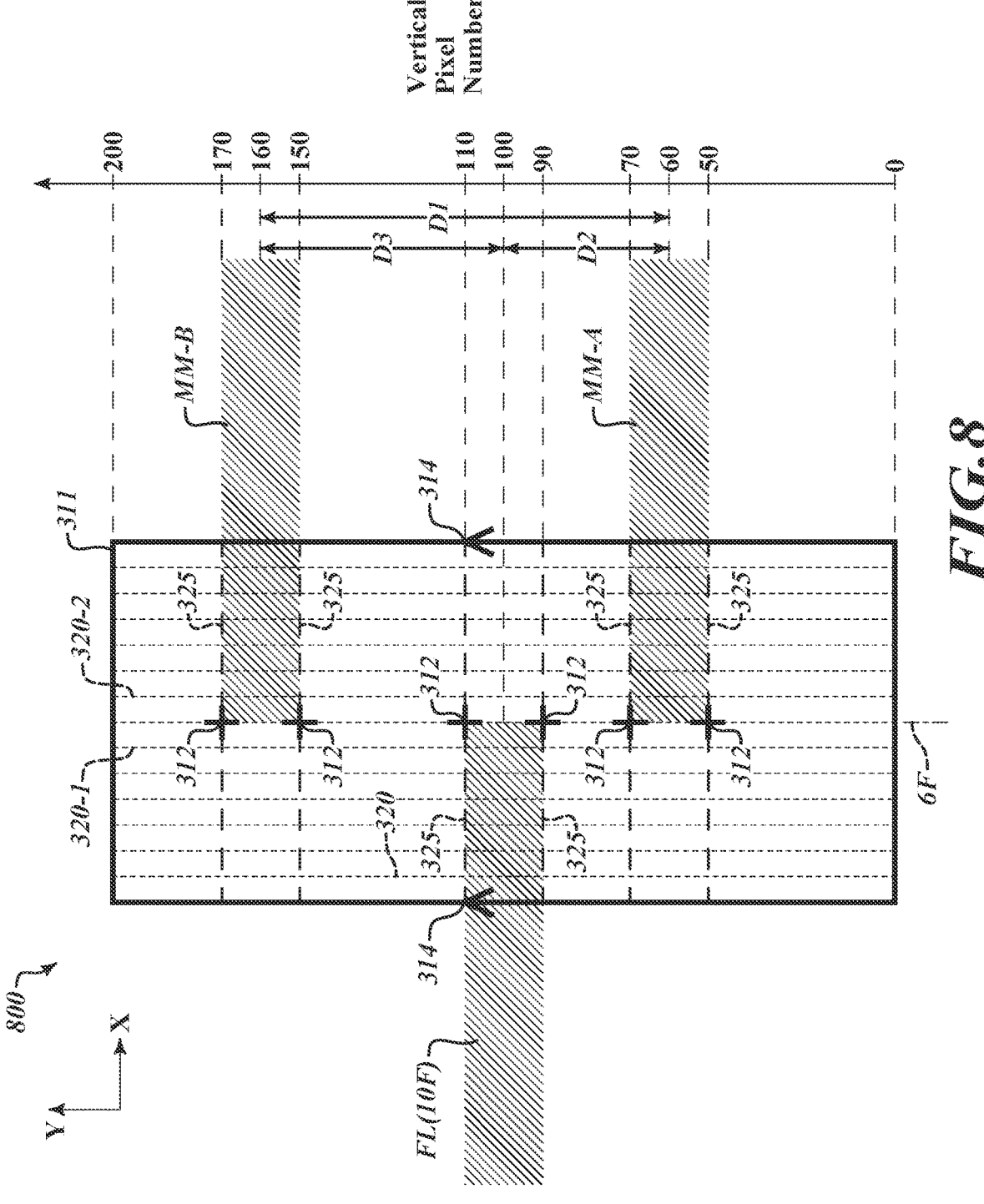
FIG. 8 is a diagram of an exemplary box tool overlaying two fine measurement markings (fine scale markings) and a fine fiducial line positioned between the two fine measurement markings.

FIG. 8 is a diagram of an exemplary box tool (similar to the box tool illustrated in FIG. 4 above) including a region of interest (ROI) indicator 311, which may be used to define or detect two edges 325 of a fiducial line FL (e.g., the fine fiducial line 10F) on the left, and two edges each of the first and second measurement markings MM-A and MM-B (e.g., two fine measurement markings) on the right, in an image 800. For each of the fiducial line FL and the first and second measurement markings MM-A and MM-B, an edge selector 312 may overlay two edges 325 of a corresponding shaded area, as corresponding to the locations of the two edges along the y-axis.

These types of operations to determine the locations of the fiducial line FL and the first and second measurement markings MM-A and MM-B could be performed with a single large box tool having the large region of interest ROI 311 as shown in FIG. 8, or with multiple uses of individual smaller tools as shown in FIGS. 3 and 4, or otherwise as performed by any system using scan lines or similar operations (e.g., with or without other tool features as described above).

Figure 9:
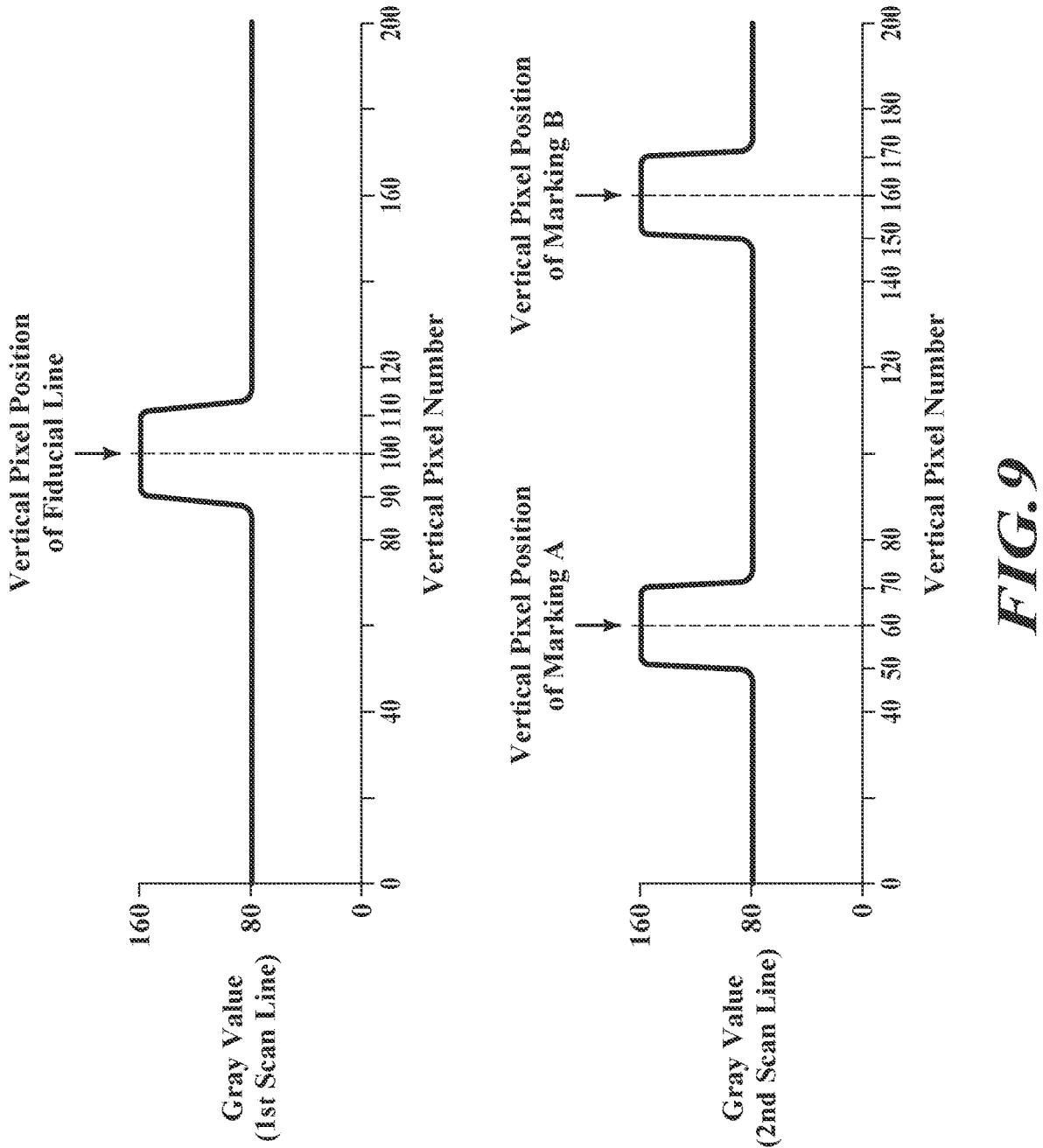
FIG. 9 is a diagram illustrating one exemplary method of determining locations of two fine measurement markings (fine scale markings) and a location of a fine fiducial line positioned between the two fine measurement markings based on sets of pixel gray values.

FIG. 9 is a diagram illustrating one exemplary method of determining locations of the fine fiducial line 10F and the two fine measurement markings MM-A and MM-B, as shown in FIG. 8 above, based on sets of pixel intensity values. In FIG. 9, the data points (pixel positions) are labeled as "Vertical Pixel Number" from 0-200 along the horizontal axis, which corresponds to the region of interest (ROI) indicator 311 of FIG. 8 including 200 pixels along the y-axis (i.e., the box tool has a height of 200 pixels, with each vertical scan line 320 extending over 200 pixels). In FIG. 9, the top graph indicates an intensity profile of the fine fiducial line 10F comprising a set of image pixel intensity (gray) values, which indicate a relatively darker region from data points 90 to 110. The top graph is generated based on a first scan line (or a first set of scan lines) 320-1 which traverses the fine fiducial line 10F as shown in FIG. 8. The bottom graph of FIG. 9 indicates an intensity profile of the two fine measurement markings MM-A and MM-B comprising a set of image pixel intensity (gray) values, which indicate a first relatively darker region from data points 50 to 70 and a second relatively darker region from data points 150 to 170. The bottom graph is generated based on a second scan line (or a second set of scan lines) 320-2 which traverses the first and second fine measurement markings MM-A and MM-B (see FIG. 8). Taking the average of the two edge data points, the position of the fine fiducial line 10F can be determined to be 100, the position of the first fine measurement marking MM-A can be determined to be 60, and the position of the second fine measurement marking MM-B can be determined to be 160. Then, referring additionally to FIG. 8, the distance between the first and second fine measurement markings MM-A and MM-B along the y-axis may be calculated to be D1=100 (=160−60), the distance between the first fine measurement marking MM-A and the fine fiducial line 10F may be calculated to be D2=40 (=100−60), and the distance between the fine fiducial line 10F and the second fine measurement marking MM-B may be calculated to be D3=60 (=160−100).

With respect to the example of FIG. 8, in some implementations it may be useful to take data from several scan lines 320 such as the first set of scan lines 320-1 or the second set of scan lines 320-2 in order to determine a precise location (e.g., a vertical pixel location) of a fiducial line or a measurement marking. For example, some measurement markings may have varying thickness across their x-axis lengths, for which taking an average as determined from a number of scan lines may help achieve a more precise determination of the vertical pixel location of the measurement marking.

In various exemplary embodiments, the micrometer head displacement system 100/101 determines a fine measurement corresponding to a fine relative position between the fine scale 10 and the fine fiducial line 10F based on calculating an interpolated position of the fine fiducial line 10F in an image. Thus, exemplary embodiments of the invention may essentially function to provide levels of accuracy (e.g., micron or sub-micron accuracy) that are similar to or better than those that may be provided by a micrometer head including a Vernier scale. Unlike a conventional Vernier scale that may be difficult to read/interpret, exemplary embodiments of the invention, even when utilized by a novice user, are capable of reliably and accurately determining a fine measurement based on image recognition analysis including interpolation processing of the image of the micrometer head MH.

Various methods of performing such interpolation processing are possible. One non-limiting specific example for illustration purposes is described below. The process or method includes:

(a) Evaluate an image acquired by the imaging portion 20 to determine a location of the fine fiducial line 10F, such as by using a contrast curve analysis as described above. In the illustrated example of FIGS. 8 and 9, the edges of the fine fiducial line 10F are at vertical pixel locations of 90 and 110 (e.g., as determined utilizing peaks of gradient magnitudes, such as illustrated at bottoms of FIGS. 5 and 7). By taking the average of those two edge positions, the fine fiducial line 10F is determined to have a vertical pixel location of 100 (=(90+110)/2).

(b) Evaluate the image to determine the first fine measurement marking MM-A which is closest and does not exceed the fine fiducial line 10F according to the micrometer head reading convention (e.g., the fine measurement marking of "0" that is just below the fine fiducial line 10F in FIG. 2), and determine a first fine measurement based on the position of the first fine measurement marking MM-A. In the illustrated example of FIGS. 8 and 9, the first fine measurement marking MM-A is determined to have a vertical pixel location of 60 between its two edges at 50 and 70. In the present example, it is assumed that the first fine measurement marking MM-A as just below the fine fiducial line 10F corresponds to the first fine measurement of "0.49 mm," for example (e.g., in a type 50 micrometer head as described herein).

(c) Evaluate the image to determine the location of the second fine measurement marking MM-B of the fine scale 10, which is adjacent to the first fine measurement marking MM-A such that a vertical position of the fine fiducial line 10F falls within a first distance (D1) which is a full fine incremental distance between the first and second fine measurement markings MM-A and MM-B. In the example of FIGS. 8 and 9, the second fine measurement marking MM-B has edges at 150 and 170, thus having an average pixel location of 160, and the full fine incremental distance D1 is therefore 100 (=160−60). If a rotation of the thimble 8 by the full fine increment distance D1 corresponds to a micrometer head displacement increment of 0.01 mm, then each pixel difference corresponds to a change in a micrometer head displacement of 0.01 mm/100 pixels=0.0001 mm/pixel.

(d) Determine a distance between the location of the fine fiducial line 10F and at least one of the two fine measurement markings MM-A and MM-B as corresponding to a partial fine increment distance. In this example, a second distance (D2) between the first fine measurement marking MM-A and the fine fiducial line 10F may be calculated to be 100−60=40 pixels.

(e) Determine an interpolated fine measurement based at least in part on a ratio between the partial fine increment distance (e.g., D2 corresponding to 40 pixels) and the full fine increment distance (e.g., D1 corresponding to 100 pixels). In the illustrated example, the interpolated position based on the partial fine increment distance between the first fine measurement marking MM-A and the fine fiducial line 10F is 40% (or 0.4) of the full fine increment distance from the first fine measurement marking MM-A to the second fine measurement marking MM-B, which is 40% (or 0.4) of 0.01 mm=0.004 mm. Note that this also equates to 40 pixels×0.0001 mm/pixel=0.004 mm, as described above.

(f) Determine the fine measurement based at least in part on summing the first fine measurement (e.g., 0.49 mm) and the interpolated fine measurement (e.g., 0.004 mm). That is, the first fine measurement marking MM-A positioned just below the fine fiducial line 10F is determined to indicate the first fine measurement of 0.49 mm, and the interpolated position of the fine fiducial line 10F at a partial distance from the first fine measurement marking MM-A to the fine fiducial line 10F indicates the interpolated fine measurement of an additional 0.004 mm. Therefore, the fine measurement for the fine scale=0.49 mm+0.004 mm=0.494 mm.

In this example, if the coarse scale has a reading of 2.5 mm, then a total micrometer head displacement=2.5 mm+0.494 mm=2.994 mm=the micrometer head measurement, as shown in FIG. 1 for example. In relation to this example, as described above with respect to FIGS. 1 and 2, a coarse scale reading of 2.5 mm may be determined by reading, via image analysis, a vertical coarse marking (not shown) that is located closest to (to the left of) the coarse fiducial line 6F which corresponds to the edge of the thimble 8 of the micrometer head MH. As one specific example, determining the coarse measurement may include: using image recognition on the coarse scale 6 to identify a zero marking; scanning from left to right, using edge detection algorithms, to count a number of coarse measurement markings until reaching the coarse fiducial line 6F, and determining the coarse measurement based on the counted number of coarse measurement markings. For example, when the coarse scale increments are 0.25 mm and twelve coarse measurement markings are counted from the zero (0) marking, the coarse measurement is 0.25 mm×12=3.00 mm (see FIG. 2). Similarly, in relation to this present example, when the coarse scale increments are 0.5 mm and five coarse measurement markings are counted from the zero (0) marking, the coarse measurement is 0.5 mm×5=2.5 mm.

Although the foregoing disclosure has described a monochromatic image for clarity of description, edge detection may be performed in an analogous manner in an image comprising interspersed color pixels, for example an image comprising red, green and blue color channel pixels. As one example, the different color channel images may be treated as monochromatic images in a shared, overall, coordinate system. Each of the color channel images may be analyzed as previously described, and the resulting measurements from each of the channels may be combined by averaging, or other appropriate methods, in the overall coordinate system. In another example, the color channels may be combined according to known methods to provide a suitable "monochromatic" pseudo-image, which may be analyzed according to the foregoing methods.

Figure 10:
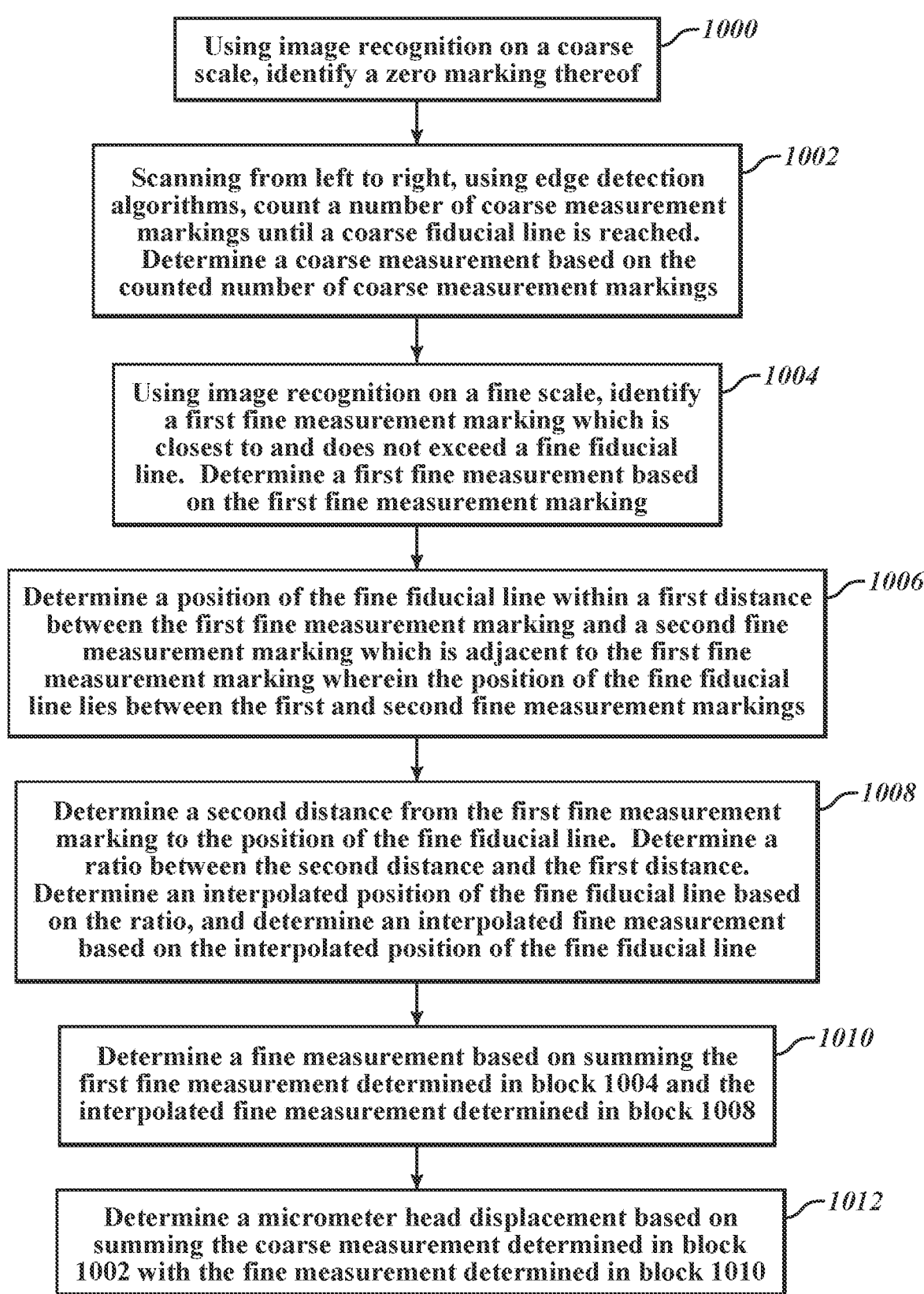
FIG. 10 is a flow diagram illustrating a method for operating a micrometer head displacement system to determine a micrometer head displacement based on image recognition processing of an image of a scale portion of a micrometer head.

FIG. 10 is a flow diagram illustrating a non-limiting example of a method for operating a micrometer head displacement system to determine a micrometer head displacement based on image recognition processing. Any of the micrometer head displacement systems 100 and 101 described above or their modifications may be used for implementing the method.

In block 1000, using image recognition on a coarse scale 6 included in an image acquired by the imaging portion 20, a zero (0) marking on the coarse scale 6 is identified.

In block 1002, scanning from left to right, using edge detection algorithms, a number of coarse measurement markings is counted until the coarse fiducial line 6F (the inner edge of the thimble 8) is reached. A coarse measurement is determined based on the counted number of coarse measurement markings. The measurement will depend on the type of the micrometer head MH incorporated in the micrometer head displacement system 100/101. For example, if the micrometer head MH is of Type 25 described above wherein the fine scale numbers go from 0-24 (total 25) with graduation of 0.01 mm, the coarse scale increments are 0.01 mm×25=0.25 mm, whereas if the micrometer head MH is of Type 50, the coarse scale increments are 0.5 mm, and if the micrometer head MH is of Type 100, the coarse scale increments are 1.0 mm. The type of the micrometer head MH may be preconfigured (e.g., stored in the memory 24) or may be entered by the user via the input elements 29, as described above.

In block 1004, using image recognition on a fine scale 10 in the image, a first fine measurement marking MM-A which is closest to and does not exceed the fine fiducial line 10F is identified. A first fine measurement is determined based on the first fine measurement marking MM-A. In the example of FIG. 8, the first fine measurement marking MM-A numbered 49 may be identified on the micrometer head MH of Type 100 to indicate the first fine measurement of 0.49 mm.

In block 1006, a position of the fine fiducial line 10F within a first distance D1 between the first fine measurement marking MM-A and a second fine measurement marking MM-B is determined, wherein the second fine measurement marking MM-B is adjacent to the first fine measurement marking MM-B such that the position of the fine fiducial line 10F lies between the first and second fine measurement markings MM-A and MM-B. In the example of FIG. 8, D1=100.

In block 1008, a second distance D2 from the first fine measurement marking MM-A to the position of the fine fiducial line 10F is determined, and a ratio between the second distance D2 and the first distance D1 is determined. In the example of FIG. 8, D2=40, and thus the ratio is 0.4 (40%). An interpolated position of the fine fiducial line 10F may be determined based on the ratio, and an interpolated fine measurement is determined based on the interpolated position of the fine fiducial line 10F. In the example of FIG. 8, the interpolated fine measurement is determined to be 0.004 mm based on the interpolated position which is at 0.4 (40%) of the fine scale increment 0.01 mm.

In block 1010, a fine measurement is determined based on summing the first fine measurement determined in block 1004 (e.g., 0.49 mm) and the interpolated fine measurement determined in block 1008 (e.g., 0.004 mm).

In block 1012, a micrometer head displacement (e.g., 2.994 mm) is determined by summing the coarse measurement determined in block 1002 (e.g., 2.5 mm) with the fine measurement determined in block 1010 (e.g., 0.494 mm).

While exemplary embodiments of the invention have been illustrated and described, numerous variations in the illustrated and described arrangements of features and sequences of operations will be apparent to one skilled in the art based on this disclosure. Also, the principles disclosed herein may be readily and desirably combined with various features disclosed in the incorporated references. These and other changes can be made to the implementations in light of the above-detailed description. In general, in the following claims, the terms used should not be construed to limit the claims to the specific implementations disclosed in the specification, but should be construed to include all possible implementations along with the full scope of equivalents to which such claims are entitled.

The invention claimed is:

1. A micrometer head displacement system, comprising:
an imaging portion comprising at least one camera and configured to acquire images of a micrometer head, the micrometer head comprising:
a coarse scale and a coarse fiducial line configured to move relative to one another for indicating a coarse scale measurement; and
a fine scale and a fine fiducial line configured to move relative to one another for indicating a fine scale measurement;
a display configured to indicate the micrometer head displacement, wherein the display is configured to provide a positive indication confirming proper positioning of the imaging portion relative to the micrometer head;
one or more processors; and
a memory coupled to the one or more processors and storing program instructions that when executed by the one or more processors cause the one or more processors to at least:
acquire at least one image of the micrometer head from the imaging portion;
determine a coarse measurement based at least in part on the at least one image, wherein the coarse measurement corresponds to a coarse relative position between the coarse scale and the coarse fiducial line;
determine a fine measurement based at least in part on the at least one image and based on calculating an interpolated position of the fine fiducial line, wherein the fine measurement corresponds to a fine relative position between the fine scale and the fine fiducial line; and
determine a micrometer head displacement based at least in part on summing the coarse measurement with the fine measurement.

2. The micrometer head displacement system of claim 1, wherein the display is configured to include a view window which displays the at least one image of the micrometer head.

3. The micrometer head displacement system of claim 1, wherein the one or more processors confirm the proper positioning when the fine fiducial line is positioned at a center of a field of view of the imaging portion and a substantially equal number of fine measurement markings appear on either side of the fine fiducial line.

4. The micrometer head displacement system of claim 1, wherein the one or more processors are configured to determine the coarse measurement, the fine measurement, and the micrometer head displacement in response to a user action responsive to the positive indication.

5. The micrometer head displacement system of claim 1, wherein the micrometer head displacement is stored in the memory.

6. The micrometer head displacement system of claim 1, comprising a motor system configured to operate the micrometer head, wherein the one or more processors are configured to drive the motor system based on the micrometer head displacement.

7. The micrometer head displacement system of claim 1, wherein the calculating the interpolated position of the fine fiducial line includes:
on the fine scale, determining a first fine measurement marking which is closest and does not exceed the fine fiducial line, and determining a first fine measurement based on the first fine measurement marking;
determining a position of the fine fiducial line within a first distance between the first fine measurement marking and a second fine measurement marking, which is adjacent to the first fine measurement marking wherein the position of the fine fiducial line lies between the first and second fine measurement markings; and
determining a ratio between a second distance from the first fine measurement marking to the position of the fine fiducial line and the first distance from the first fine measurement marking to the second fine measurement marking, and calculating the interpolated position of the fine fiducial line based on the ratio.

8. The micrometer head displacement system of claim 7, wherein the determining the fine measurement includes:
summing the first fine measurement which is based on the first fine measurement marking with an interpolated fine measurement which is based on the interpolated position of the fine fiducial line.

9. The micrometer head displacement system of claim 1, wherein the calculating the interpolated position of the fine fiducial line includes utilizing a contrast curve analysis to determine a location of the fine fiducial line and locations of fine measurement markings of the fine scale.

10. The micrometer head displacement system of claim 9, wherein the one or more processors are configured to execute an edge tool to determine the location of the fine fiducial line and the locations of the fine measurement markings of the fine scale.

11. The micrometer head displacement system of claim 1, wherein the determining the coarse measurement includes:
using image recognition on the coarse scale to identify a zero marking;
scanning from left to right, using edge detection algorithms, to count a number of coarse measurement markings until reaching the coarse fiducial line; and
determining the coarse measurement based on the counted number of coarse measurement markings.

12. The micrometer head displacement system of claim 1, wherein the positive indication is configured to be provided for confirming the proper positioning when the fine fiducial line is approximately positioned at a center of a field of view of the imaging portion and a substantially equal number of fine measurement markings appear on either side of the fine fiducial line.

13. A method of operating a micrometer head displacement system, comprising:

controlling an imaging portion of the micrometer head displacement system comprising at least one camera to acquire at least one image of a micrometer head, wherein the micrometer head includes a coarse scale and a coarse fiducial line configured to move relative to one another for indicating a coarse scale measurement, and a fine scale and a fine fiducial line configured to move relative to one another for indicating a fine scale measurement;

displaying a positive indication on a screen to indicate proper positioning of the imaging portion relative to the micrometer head;

determining a coarse measurement based at least in part on the at least one image, wherein the coarse measurement corresponds to a coarse relative position between the coarse scale and the coarse fiducial line;

determining a fine measurement based at least in part on the at least one image and based on calculating an interpolated position of the fine fiducial line, wherein the fine measurement corresponds to a fine relative position between the fine scale and the fine fiducial line; and determining a micrometer head displacement based at least in part on summing the coarse measurement with the fine measurement.

14. The method of claim 13, comprising:

displaying the micrometer head displacement on a screen.

15. The method of claim 13, comprising:

displaying the at least one image of the micrometer head on a screen.

16. The method of claim 13, comprising:

utilizing a contrast curve analysis on the at least one image of the micrometer head to determine a location of the fine fiducial line and locations of fine measurement markings of the fine scale.

17. The method of claim 16, wherein the utilizing of the contrast curve analysis comprises:

utilizing contrast curve analysis for determining two edge locations for the fine fiducial line, wherein the location of the fine fiducial line is determined according to at least one of a middle or average between the two edge locations of the fine fiducial line;

utilizing contrast curve analysis for determining two edge locations for the first fine measurement marking, wherein the location of the first fine measurement marking is determined according to at least one of a middle or average between the two edge locations of the first fine measurement marking; and utilizing contrast curve analysis for determining two edge locations for the second fine measurement marking, wherein the location of the second fine measurement marking is determined according to at least one of a middle or average between the two edge locations of the second fine measurement marking.

18. The method of claim 13, comprising:

on the fine scale, determining a first fine measurement marking which is closest and does not exceed the fine fiducial line, and determining a first fine measurement based on the first fine measurement marking;

determining a position of the fine fiducial line within a first distance between the first fine measurement marking and a second fine measurement marking, which is adjacent to the first fine measurement marking wherein the position of the fine fiducial line lies between the first and second fine measurement markings;

determining a ratio between a second distance from the first fine measurement marking to the position of the fine fiducial line and the first distance from the first fine measurement marking to the second fine measurement marking, and calculating the interpolated position of the fine fiducial line based on the ratio; and determining the fine measurement by summing the first fine measurement with an interpolated fine measurement which is based on the interpolated position of the fine fiducial line.

19. The method of claim 13, comprising:

using image recognition on the coarse scale to identify a zero marking;

scanning from left to right, using edge detection algorithms, to count a number of coarse measurement markings until reaching the coarse fiducial line; and determining the coarse measurement based on the counted number of coarse measurement markings.

*     *     *     *     *